United States Patent
Li et al.

(10) Patent No.: US 12,530,501 B1
(45) Date of Patent: Jan. 20, 2026

(54) JAVA VIRTUAL MACHINE RUNTIME DATA OBFUSCATION

(71) Applicant: Zoom Communications, Inc., San Jose, CA (US)

(72) Inventors: Zhuo Li, Hangzhou (CN); Kang Qiu, Hangzhou (CN); Jingjin Xie, Hangzhou (CN); Tingming Zou, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 196 days.

(21) Appl. No.: 18/462,023

(22) Filed: Sep. 6, 2023

(51) Int. Cl.
| | |
|---|---|
| G06F 9/45 | (2006.01) |
| G06F 9/445 | (2018.01) |
| G06F 9/455 | (2018.01) |
| G06F 15/16 | (2006.01) |
| G06F 21/62 | (2013.01) |
| H04L 15/16 | (2006.01) |

(52) U.S. Cl.
CPC ...... *G06F 21/6281* (2013.01); *G06F 9/44521* (2013.01); *G06F 9/45558* (2013.01); *G06F 2009/4557* (2013.01)

(58) Field of Classification Search
CPC ............ G06F 21/6281; G06F 9/44521; G06F 9/45558; G06F 2009/4557
USPC ......................................................... 726/26
See application file for complete search history.

(56) References Cited

U.S. PATENT DOCUMENTS

| | | | | |
|---|---|---|---|---|
| 2008/0127156 A1* | 5/2008 | Buza | ........................ | G06F 8/52 717/136 |
| 2010/0306854 A1* | 12/2010 | Neergaard | .......... | G06F 21/6254 726/26 |
| 2011/0153689 A1* | 6/2011 | Hall | .................... | G06F 12/0253 707/813 |
| 2013/0152064 A1* | 6/2013 | Gagliardi | ............ | G06F 9/44521 717/166 |
| 2016/0132343 A1* | 5/2016 | Kajigaya | ............. | G06F 9/44536 719/331 |
| 2016/0232187 A1 | 8/2016 | Aoki | | |
| 2017/0351847 A1* | 12/2017 | Zvenigorodsky | ....... | G06F 8/423 |

(Continued)

FOREIGN PATENT DOCUMENTS

| | | | | |
|---|---|---|---|---|
| CN | 108170433 A | * | 6/2018 | ............. G06F 8/434 |
| CN | 114722359 A | * | 7/2022 | ............. G06F 21/14 |
| WO | WO-2020248512 A1 | * | 12/2020 | ........... G06F 9/4482 |

OTHER PUBLICATIONS

GitHub, PayPal, Heap-dump-tool, Tool to sanitize data from Java heap dumps., https://github.com/paypal/heap-dump-tool, Jun. 15, 2023, 6 pages.

(Continued)

*Primary Examiner* — Emmanuel L Moise
*Assistant Examiner* — Berhanu Shitayewoldetadik
(74) *Attorney, Agent, or Firm* — Young Basile Hanlon & MacFarlane, P.C.

(57) ABSTRACT

A heap dump of a running application is obtained. For each object of one or more objects in the heap dump, the object may be obfuscated based on its class loader. A class loader of a class of the object is identified. A determination is made as to whether the class loader is of an application-specific class loader type. In response to determining that the class loader is of the application-specific class loader type, the object is obfuscated. The class loader is of an application-specific class loader type if is an application class loader or a custom class loader.

20 Claims, 8 Drawing Sheets

(56) References Cited

U.S. PATENT DOCUMENTS

| | | | | |
|---|---|---|---|---|
| 2018/0157764 A1* | 6/2018 | Longo | ............... | G06F 16/951 |
| 2018/0357008 A1* | 12/2018 | Hirt | ............ | G06F 12/02 |
| 2021/0191745 A1* | 6/2021 | Pacht | ............. | G06F 11/0778 |
| 2023/0078607 A1* | 3/2023 | Fong | ............. | G06F 21/62 |
| | | | | 726/26 |

OTHER PUBLICATIONS

GitHub, PayPal, heap-dump-tool, Java Heap Dump Sanitizer, https://github.com/paypal/heap-dump-tool/blob/statics/whitepaper.pdf, Myo Ohn, Jun. 2020, 7 pages.

The Security Vault, Heap Inspection, https://thesecurityvault.com/heap-inspection/, Luisfontes19, Jun. 16, 2019, 11 pages.

CrashDocs, Mask sensitive heap data, https://docs.ycrash.io/ycrash-server/administration/mask-sensitive-heap-data.html, Sep. 2023, 2 pages.

Geeks for Geeks, Different Ways to Capture Java Heap Dumps, https://www.geeksforgeeks.org/different-ways-to-capture-java-heap-dumps/, Akashpandit1103, Apr. 21, 2021, 11 pages.

Open JDK, HPROF Agent, https://hg.openjdk.org/jdk6/jdk6/jdk/raw-file/tip/src/share/demo/jvmti/hprof/manual.html, Sep. 2023, 11 pages.

Oracle, HPROF: A Heap/CPU Profiling Tool, https://docs.oracle.com/javase/8/docs/technotes/samples/hprof.html, Sep. 2023, 6 pages.

Geeks for Geets, ClassLoader in Java, https://www.geeksforgeeks.org/classloader-in-java/, Dannanamanoj, Dec. 5, 2022, 9 pages.

DigitalOcean, Java Heap Space vs Stack—Memory Allocation in Java, https://www.digitalocean.com/community/tutorials/java-heap-space-vs-stack-memory#heap-and-stack-memory-in-java-program, Pankaj, Aug. 3, 2022, 13 pages.

* cited by examiner

JAVA VIRTUAL MACHINE RUNTIME DATA OBFUSCATION

FIELD

This disclosure generally relates to heap dumps, and, more specifically, to obfuscating data in a heap dump.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
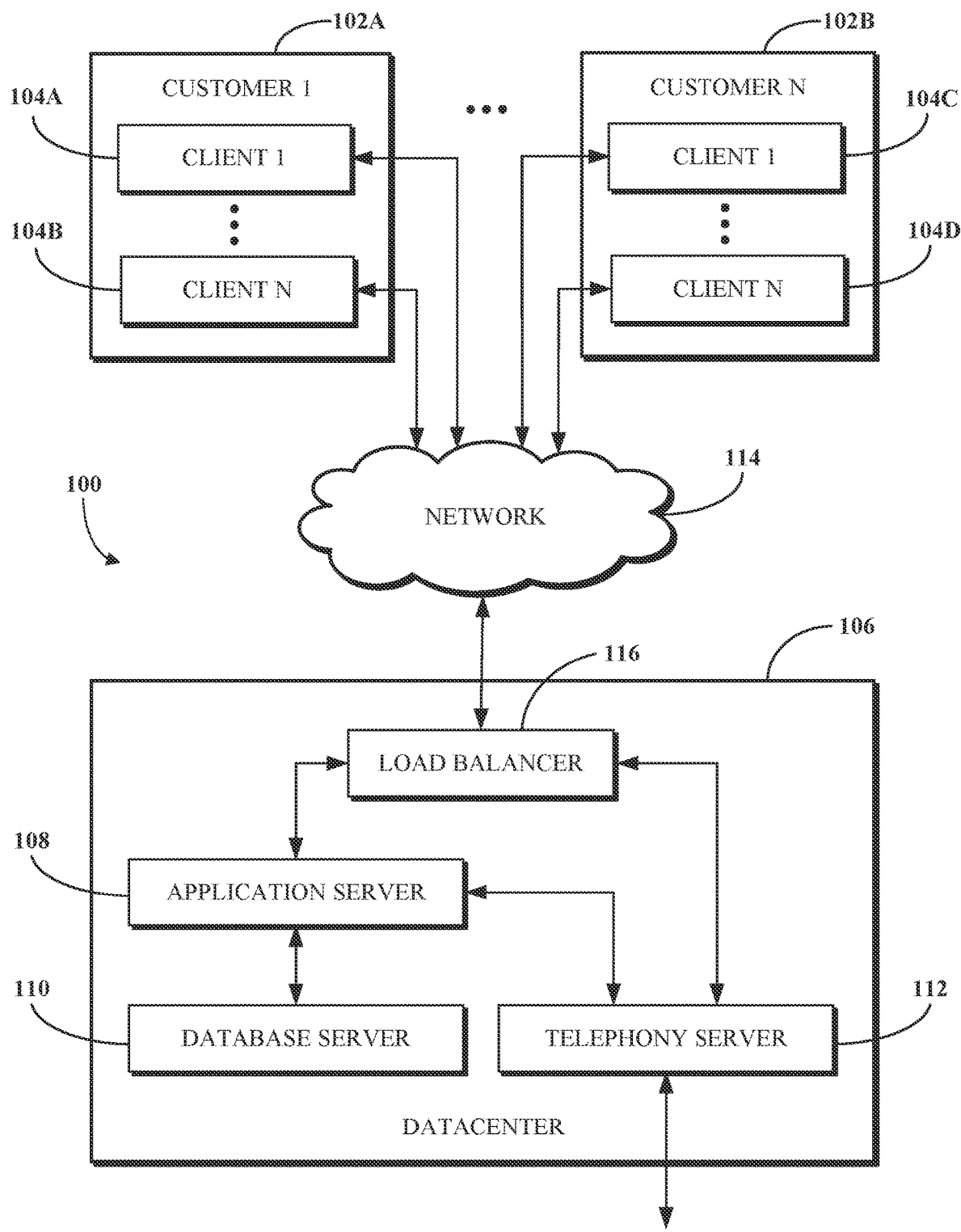
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

As further described below, a UCaaS, at least some components thereof, and/or clients associated therewith, may be implemented as one or more Java programs that are executed by one or more Java Virtual Machines (JVMs). It is often necessary to obtain a heap dump from these running Java programs (and, generally, from any Java program). A heap dump is a snapshot of the Java heap at a particular point in time and may be used, such as by software developers or quality assurance engineers, for debugging and troubleshooting a variety of problems, such as logic errors, performance problems, memory leaks, out-of-memory exceptions, and excessive garbage collections.

Several tools are available for obtaining heap dumps. For example, the Java Development Kit (JDK) includes the Heap Profiling (HPROF) tool that can be used to, inter alia, collect heap allocation statistics and heap dumps. A number of commercial and open-source tools are available for analyzing and viewing the information captured in a heap dump, such as a heap dump output by HPROF.

A heap dump may include information regarding all objects in the heap, including their size and type; details about all the classes, including class loaders and static fields; and the relationships between objects, i.e., which objects reference which other objects or are referenced by which other objects. A heap dump may also include the actual data (i.e., data values) stored in an object (e.g., in fields of the object). Such actual data may include integer, float, string, and other data. At least some of the actual data may be sensitive data, such as user data. For example, the user data may be passwords, credit card numbers, email addresses, user names, authentication tokens, or other such sensitive data that should ideally remain confidential and not exposed to users of heap dumps. There can be many different ways that a running application can obtain (and therefore the heap dump thereof would include) sensitive data. For example, user data may be input by a user, may be derived from user input, may be queried for and extracted from a data store (e.g., a database), or may be obtained from other systems at run time of an application.

Some conventional solutions may indiscriminately obfuscate all data in a heap dump, such as by replacing all field values with non-sensical or random values. As such, all data, whether application data or JVM-related data, are erased. Such conventional solutions are overbroad because they fail to preserve certain critical data within a heap dump, such as, for example, data relating to the state of running threads. Indiscriminate obfuscation of all data results in the loss of valuable insights that could have otherwise been useful in identifying root causes of problems.

Implementations of this disclosure address problems such as these by obfuscating heap dump data that are likely to be sensitive. By obfuscating sensitive data in the heap dump, unauthorized users can be prevented from accessing the sensitive data. In an example, for each object of at least some objects in the heap dump, a class loader of a class of the object is identified. If the class loader is of an application-specific class loader type, then the object is obfuscated. In an implementation, the object is obfuscated if the object meets other obfuscation criteria, as further described herein. Contrastingly, other data in the heap dump such as data related to processor (e.g., a central processing unit (CPU)) state or utilization, thread data (e.g., relating to threads created to process user data), application framework data, or the like are not sensitive data and, therefore, need not be obfuscated.

While the disclosure herein primarily describes data obfuscation with respect to a heap dump of a Java application, the concepts are not limited to Java. The techniques described herein can be used with any application that is written in a language (e.g., programming or scripting language) executable by a JVM, such as Groovy, Kotlin, and Scala. More generally, the techniques can be used with any language that includes a runtime class loader and where class loader information is available when generating heap (or, more generally, memory) dumps.

To describe some implementations in greater detail, reference is first made to examples of hardware and software structures used to implement a system for obfuscating heap dumps. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers.

In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary JVM.

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
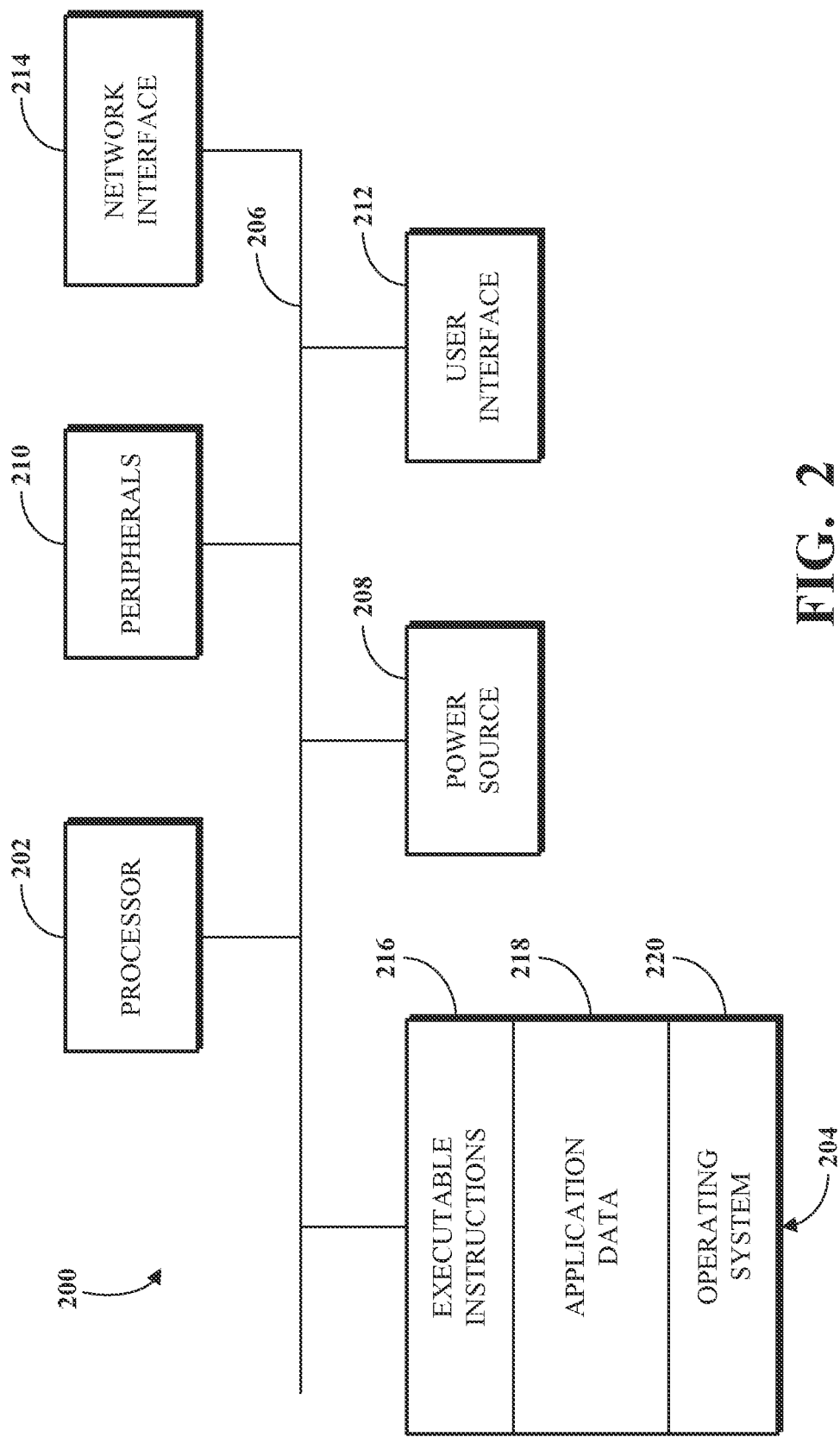
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
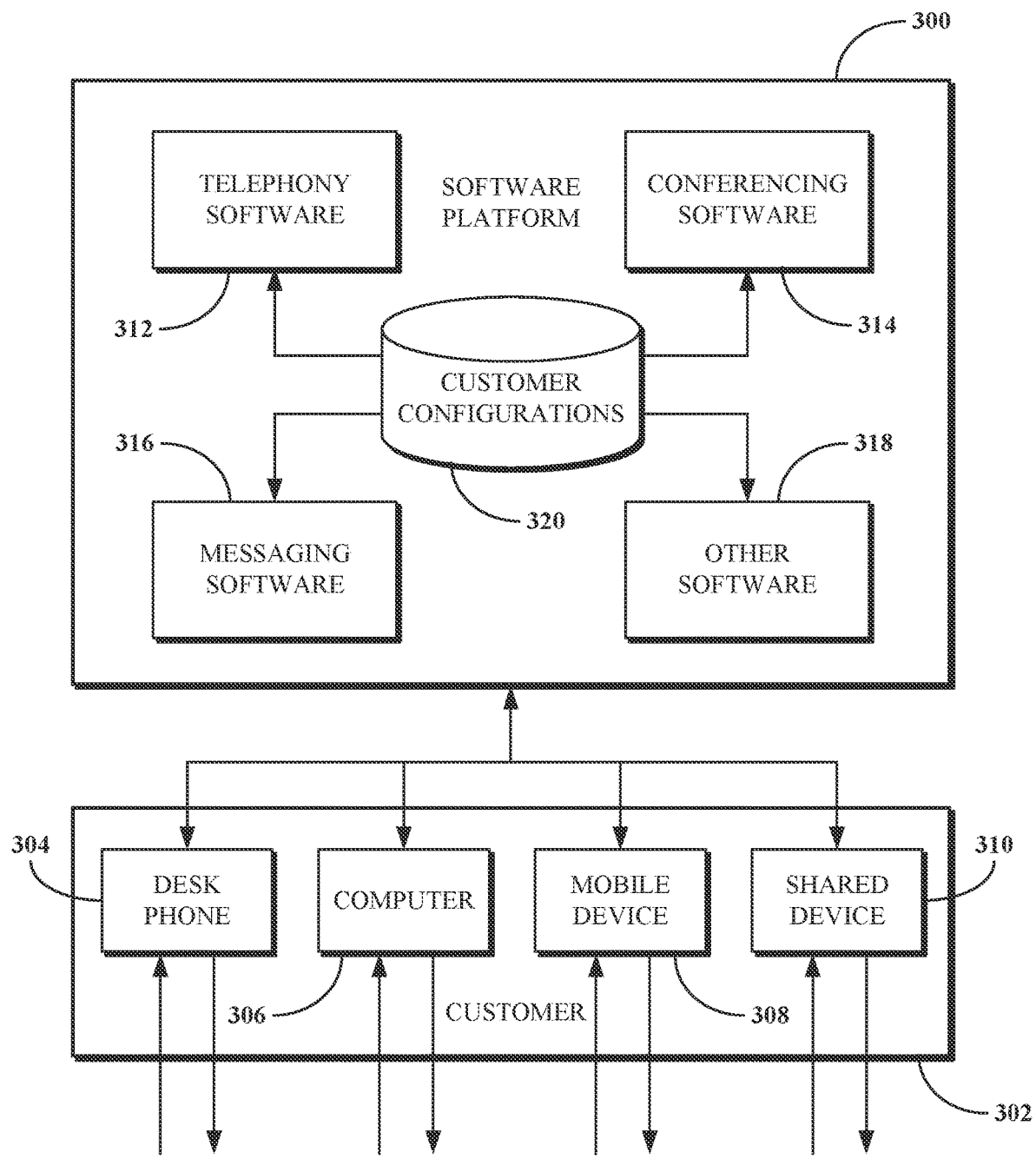
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device 310-is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a heap analysis software.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
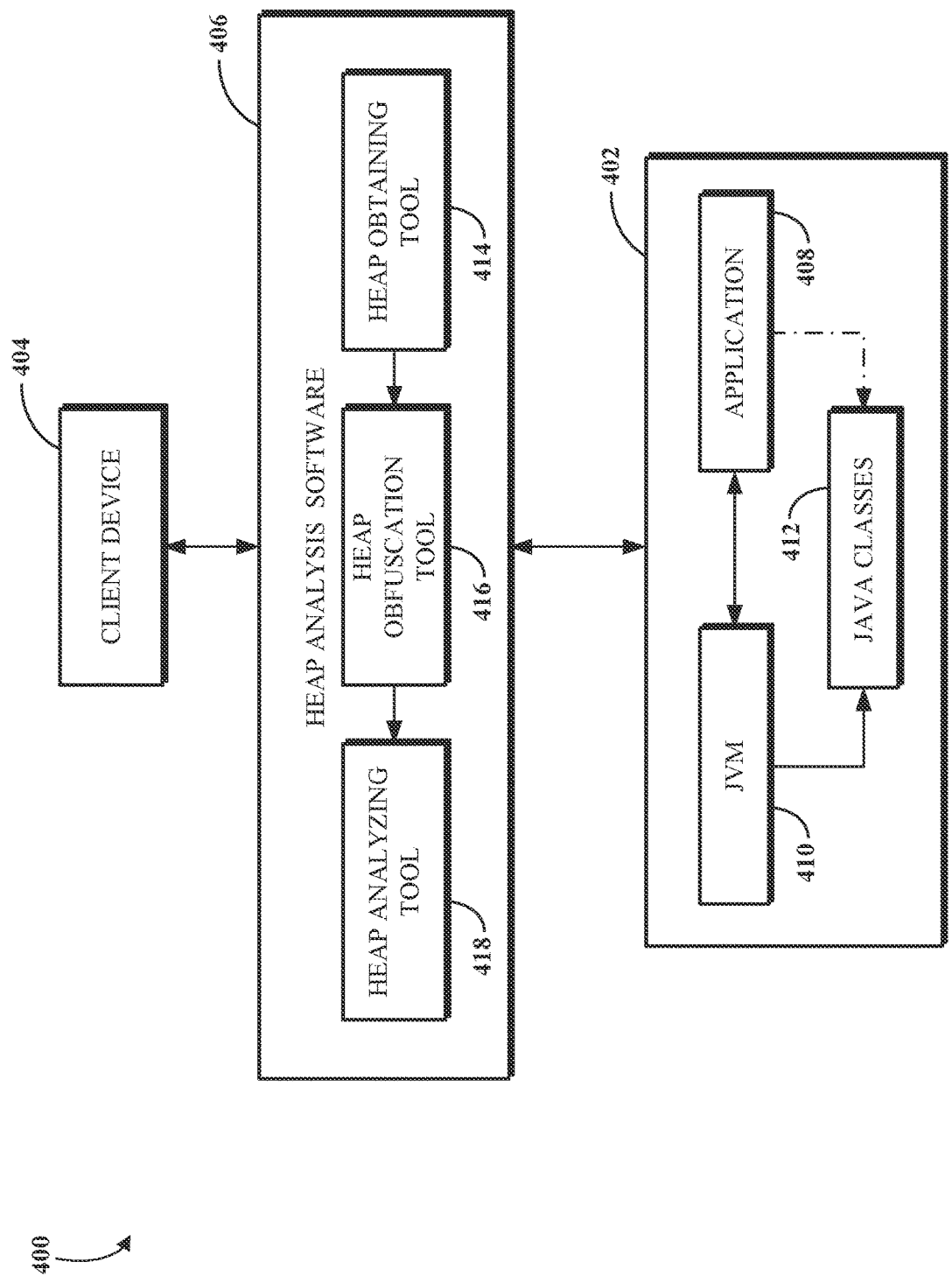
FIG. 4 is a block diagram of a system where runtime data obfuscation can be used.

FIG. 4 is a block diagram of a system 400 where runtime data obfuscation can be used. The system 400 includes a software platform 402, a client device 404, and a heap dump analysis software 406.

The software platform 402 may be the software platform 300 of FIG. 3. The software platform 402 may be available or executing at a server, such the application server 108 of FIG. 1. The software platform 402 includes or makes available services or functionality via one or more applications, such as an application 408. An application, as used in this context, can be a software or a portion thereof, that is executable by a JVM, such as a JVM 410.

The JVM 410 initiates the application 408 by first loading a main class of the application 408, using a class loader. The class loader of the JVM 410 locates the main class in a set of java classes 412, which may be available on a file system. The main class can be identified at application startup time, such as via a command issued to start the application 408. The JVM 410 then locates the method named main within this class, which serves as the entry point for the application 408. As the application 408 runs, it utilizes the JVM 410 as an abstract computing machine, executing compiled Java bytecodes while managing resources such as memory and system threads. When the application 408 requires (or references) additional classes, the JVM 410 dynamically loads the classes from the set of Java classes 412, again using a class loader.

A user of the client device 404 may desire to obtain, for analysis, a heap dump of the application 408. The client device 404 may include an application (e.g., a web browser) usable by the user to interact with the heap dump analysis software 406. The user may issue a request to the heap dump analysis software 406 to obtain a heap dump of the application 408.

The heap dump analysis software 406 includes tools, such as programs, subprograms, functions, routines, subroutines, operations, executable instructions, and/or the like for, inter alia and as further described below, obtaining a heap dump of a running application and providing tools (e.g., user interfaces) usable in analyzing heap dumps.

At least some of the heap dump analysis software 406 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program. As shown, the heap dump analysis software 406 includes a heap dump obtaining tool 414, a heap dump obfuscation tool 416, and a heap analysis tool 418. In some implementations, the heap dump analysis software 406 can include more or fewer tools. In some implementations, some of the tools may be combined, some of the tools may be split into more tools, or a combination thereof. In an example, a heap dump generation tool that is associated with the heap dump analysis software 406 may execute in the application 408 or by the JVM 410 to output a heap dump. The heap dump generation tool may use reflection APIs of the JAVA programming language in the process of generating the heap map, such as to output class structures of application 408.

The heap dump obtaining tool 414 obtains a heap dump of the application 408. More accurately, the heap dump obtaining tool 414 obtains a heap dump from the memory space of the application 408. In response to a request received from the client device 404, the heap dump obtaining tool 414 may obtain the heap dump of the application 408. The heap dump obtaining tool 414 may cause a tool in communication with or included in the JVM 410 to obtain the heap dump. In an example, the heap dump may be obtained using the HPROF tool. In an example, the heap dump may have been previously generated and the heap dump obtaining tool 414 makes the previously generated heap dump available to the heap dump obfuscation tool 416.

Prior to making the heap dump available to the user of the client device 404 via the heap analysis tool 418, the heap dump obfuscation tool 416 obfuscates sensitive data from the heap data. The heap dump obfuscation tool 416 receives a heap dump obtained from the heap dump obtaining tool 414 and outputs an obfuscated heap dump to the heap analysis tool 418. The heap dump obfuscation tool 416, which is further described with respect to FIGS. 7-8, uses class loader information in the heap dump to determine whether fields of an objects are obfuscated or not.

The heap dump obfuscation tool 416 enables privacy protection and prevents data leaks. Obfuscating the sensitive data generally means rendering the sensitive value unclear, difficult to understand, or have meaningless values, such as by replacing the sensitive data with non-sensical or random data. In an example, the sensitive data may be replaced by zero or null values. Furthermore, in some cases, the sensitive data are replaced by data of equal lengths to the original data. To illustrate, without limitations, a String object with the value "password1234" (e.g., 24 bytes assuming UTF-16, which uses 2 bytes per character) may be obfuscated to "000000000000." As such, the structural integrity of the heap dump can be maintained while ensuring, for example, the confidentiality of sensitive information.

The heap analysis tool 418 makes the obfuscated heap dump available for analysis to a user of the client device 404. The heap analysis tool 418 may provide user interfaces usable by the user to analyze or view results of the analysis of the obfuscated heap dump. To illustrate, without limitations, the user may inquire as to the total number of String objects or the total amount of space (in bytes) occupied by instances of the class ConferenceParticipant; or the user may drill into specific ConferenceParticipant objects to view the obfuscated values in their respective fields. The heap analysis tool 418 may identify different global collection roots and leak suspects in the obfuscated heap dump. The heap analysis tool 418 may identify which classes are loaded with which class loaders of the JVM 410.

Figures 5A, 5B:
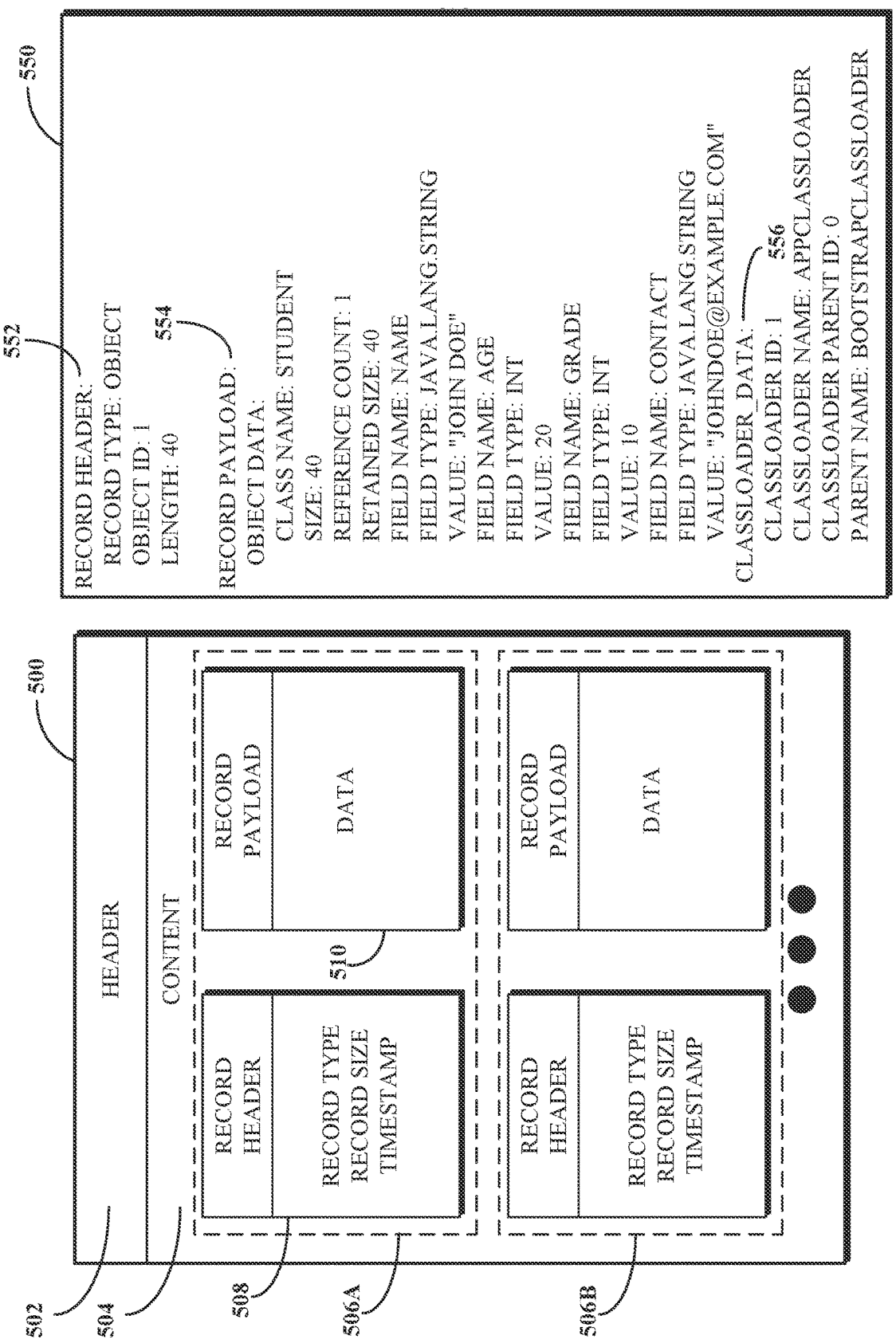
FIG. 5A illustrates an example of a structure of a heap dump file usable by a heap dump obfuscation tool.
FIG. 5B illustrates an example of data that may be included in one record or assembled based on multiple records of a heap dump.

FIG. 5A illustrates an example of a structure 500 of a heap dump file usable by the heap dump obfuscation tool 416. The structure 500 illustrates the structure of an HPROF file. The structure 500 is a mere illustration of the data included in the HPROF and may not correspond specifically to the structure of an HPROF file. An exact description or understanding of the structure of an HPROF file is not necessary to the understanding of this disclosure. Additionally, the disclosure herein is not so limited to heap dumps generated by the HPROF tool. Any type of heap file (and structure therefor) that includes information that enables obfuscation according to this disclosure can be used by the heap dump analysis software 406 of FIG. 4.

A header area 502 includes metadata. These metadata include details about the profiling session, such as the version of the HPROF format used, JVM specifications (such as version, JVM flags), and a timestamp indicating the start of the profiling process. A profiling session refers to the period of time during which the JVM is collecting data about the application's memory usage for output to a heap dump. The header area 502 serves as a reference point for interpreting the subsequent content of the file and validating its integrity. To illustrate, the header area 502 may include the information "Version: 1.0," "JVM: OpenJDK 11.0.2," and "Timestamp: 2023-5-15 12:30:00."

A content area 504 includes the profile data. The content area 504 is organized into various record types (heap dump records), such as records 506A and 506B. Each record includes information regarding the heap and objects within a Java application, such as the application 408 of FIG. 4. Each record may include a record header (such as a record header 508) and a record payload (such as a record payload 510). The record header can include a record type (e.g., an identifier indicating the type of record), an object identifier (e.g., the identifier of the object that the records represents) and a record length (e.g., the size in bytes of the entire record, including the header and payload). The record payload includes individual class characteristics, including class names, super classes, instance sizes, and static fields. The record payload contains that actual data associated with the record.

At least some of the records represent live objects in the heap and provide data regarding their class, sizes, and instance data (e.g., actual data values). Records of type Class Dump describe individual class characteristics, including class names, superclasses, instance sizes, and static fields. Records of type Load Class offer details about the classes loaded by the JVM during the profiling session. Records of type Stack Trace hold information about stack traces captured during heap dumps, enabling analysis of memory allocation patterns. The heap dump file may include other record types.

A footer section (not shown) may include an end timestamp of the profiling session, which may be used to confirm the consistency and completeness of the HPROF file.

FIG. 5B illustrates an example 550 of data that may be included in one record or assembled based on multiple records of a heap dump. The example, 550 is formatted in such as a way as to facilitate and improve understandability. It is noted that a heap dump may be in binary format and records may be more complex than shown in the example 550. The example 550 may not necessarily correspond to the exact structure of a record in an HPROF file.

The example 550 illustrates a record associated with a Java class named Student (which may more accurately be, com.myapp. Student) that includes the fields: name (which is of type String); age (which is of type int); grade (which is of type int); and contact (which is of type String). A record header 552 indicates that this is an object record, with an object ID of 1 and a length of 40 bytes. The length information enables the heap dump obfuscation tool 416 to calculate offsets within the heap dump file for writing obfuscated values. Additionally, the length information can be used to determine the number of bytes of obfuscated data to write for a particular field. A record payload 554 contains the object data, which includes the class name, size, reference count, retained size, and field values. The field values for this record are the student's name (e.g., "John Doe"), age (e.g., 20), grade (e.g., 10), and contact information (e.g., "johndoe@example.com").

A record can also include (or can be used to obtain from related records) class loader information, such as shown in a class loader section 556, which indicates that the Student object was loaded by the AppClassLoader, which is the default class loader for Java applications. The AppClassLoader is a child of the BootstrapClassLoader, which is the primordial class loader that loads the Java class libraries (as further described below). While not specifically shown in FIG. 5B, a record may also include the referee object identifiers. That is, the record may include the object identifiers of the objects that reference the object described in the record.

Figure 6:
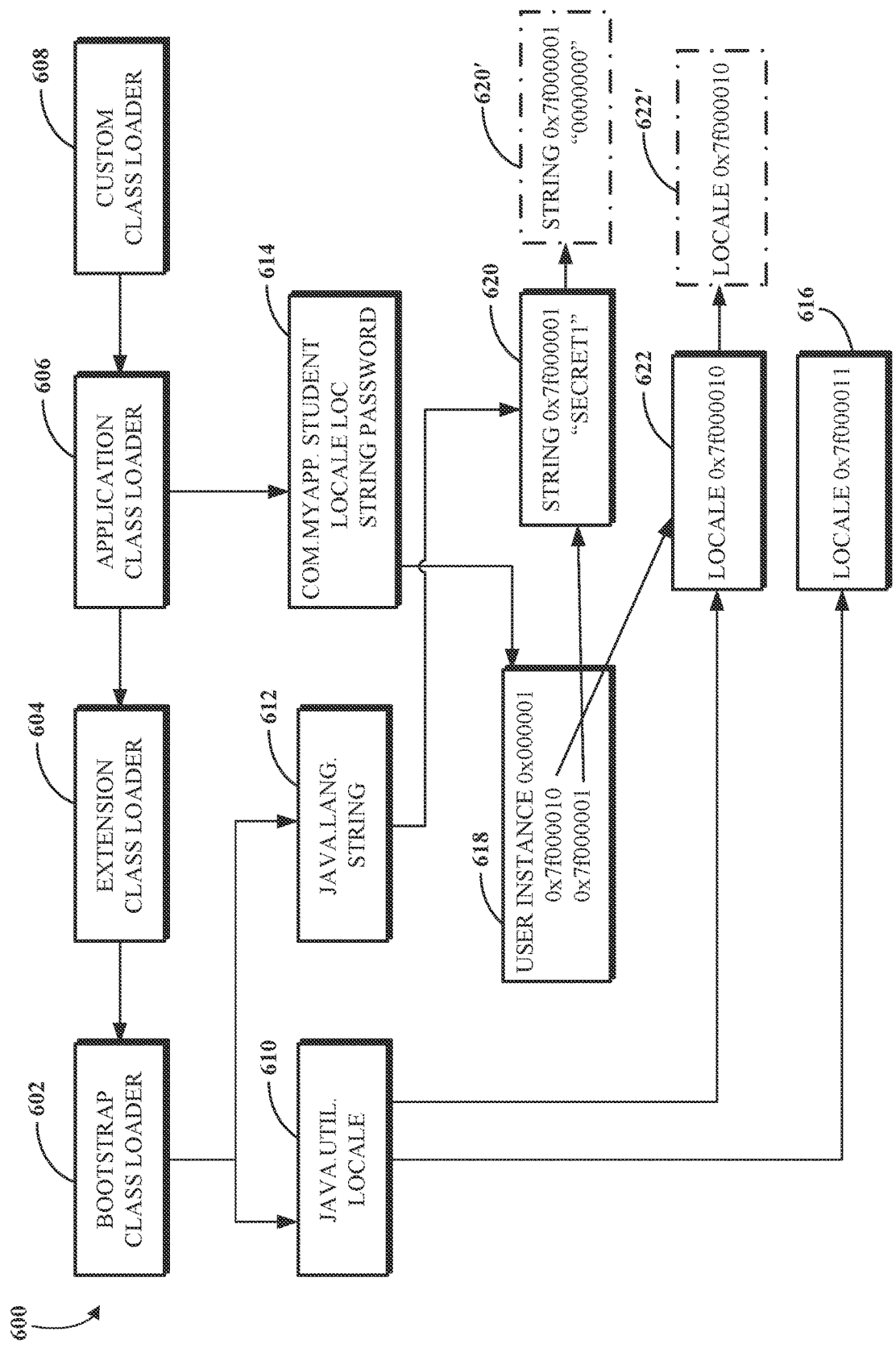
FIG. 6 illustrates a simplified example of data that may be included in a heap dump.

FIG. 6 illustrates a simplified example 600 of data that may be included in a heap dump. The simplified example 600 does not describe any particular heap dump format; rather, it is intended to convey the type of information and data included in a heap dump. As mentioned above, heap dumps can include class structures of objects, data values, and class loader information. In the simplified example 600, the heap dump shows a class 614 named com.myapp. Student that has two fields: loc (which is of type Locale) and password (which is of type String)

A brief and high level summary of class loading in Java is now described to facilitate understanding of the concepts described herein. In the Java programming language, the process of class loading involves locating, initializing, and making available classes and interfaces for a Java application, such as the application 408 of FIG. 4, at runtime. The class loading process in Java is a recursive process. When a class loader is asked to load a class, it first delegates the request to its parent class loader. If the parent class loader cannot find the class, then the child class loader will attempt to load the class itself. The class loading process is also a hierarchical process. The classes that are loaded by a class loader can only see the classes that are loaded by its parent class loaders.

Four class loaders are described herein: A bootstrap class loader 602, an extension class loader 604, an application class loader 606, and a custom class loader 608. The application class loader 606 and the custom class loader 608 are referred to as application-specific class loaders or class loaders that are of an application-specific class loader type since they are directly tied to loading classes specific to an application; whereas the bootstrap class loader 602 and the extension class loader 604 are not application-specific class loaders and are not of an application-specific class loader type. The disclosure herein may, for brevity, use statements such as "the class loader of an object or instance." These statements should be understood to mean "the class loader of the class of the object or instance."

The bootstrap class loader 602 is the parent of all Java class loaders and is built into the JVM. The bootstrap class loader 602 is responsible for loading core/fundamental classes from the Java Runtime Environment (JRE), such as classes in the packages java.lang (e.g., java.lang.Object or java.lang.String) and java.util (e.g., java.util.Date or java.util. Map) and other runtime libraries located in the <JAVA HOME>/jre/lib directory.

The extension class loader 604 takes over once the bootstrap class loader 602 finishes its process and loads classes from the java.ext.dirs system property. This property specifies a list of directories that contain JAR files with Java extensions. The extension class loader 604 is a child of bootstrap class loader 602.

The application class loader 606, which may also be referred to as the system class loader, loads classes from the classpath of the application. The classpath specifies a list of directories and JAR files that contain Java classes for the application. The application class loader 606 is a child of the extension class loader 604.

The custom class loader 608 may also be available in (e.g., implemented for) an application. The custom class loader 608 is a user-defined loader, typically extending the class java.lang.ClassLoader. A custom class loader can be used for special requirements such as for loading classes from arbitrary sources (e.g., over a network, from different sources, or in support of hot deployment).

Accordingly, the bootstrap class loader 602 is responsible for loading a class 610 (i.e., the class java.util. Locale) and a class 612 (i.e., java.lang. String); and the application class loader 606 is responsible for loading a class 614 (i.e., the class com.myapp. Student).

The simplified example 600 illustrates that at the start of the application, an instance 616 of the Locale class (i.e., class 610) was instantiated and is thus included in the heap. The identifier of the instance 616 is 0x7f000011. Additionally, an instance 616 of the class 614 (i.e., the Student class) was also created by the application and the heap includes the instance 616 with an identifier of 0x000001. The act of instantiating the instance 618 results in a String instance 620 and in a Locale instance 622 being instantiated and stored in the heap with respective identifiers of 0x7f000001 and 0x7f000010, which the instance 618 includes references to. The String instance 620 includes the value of the String (i.e., "SECRET1"). For brevity, details and contents of other instances and other objects of the heap are not shown.

Figure 7:
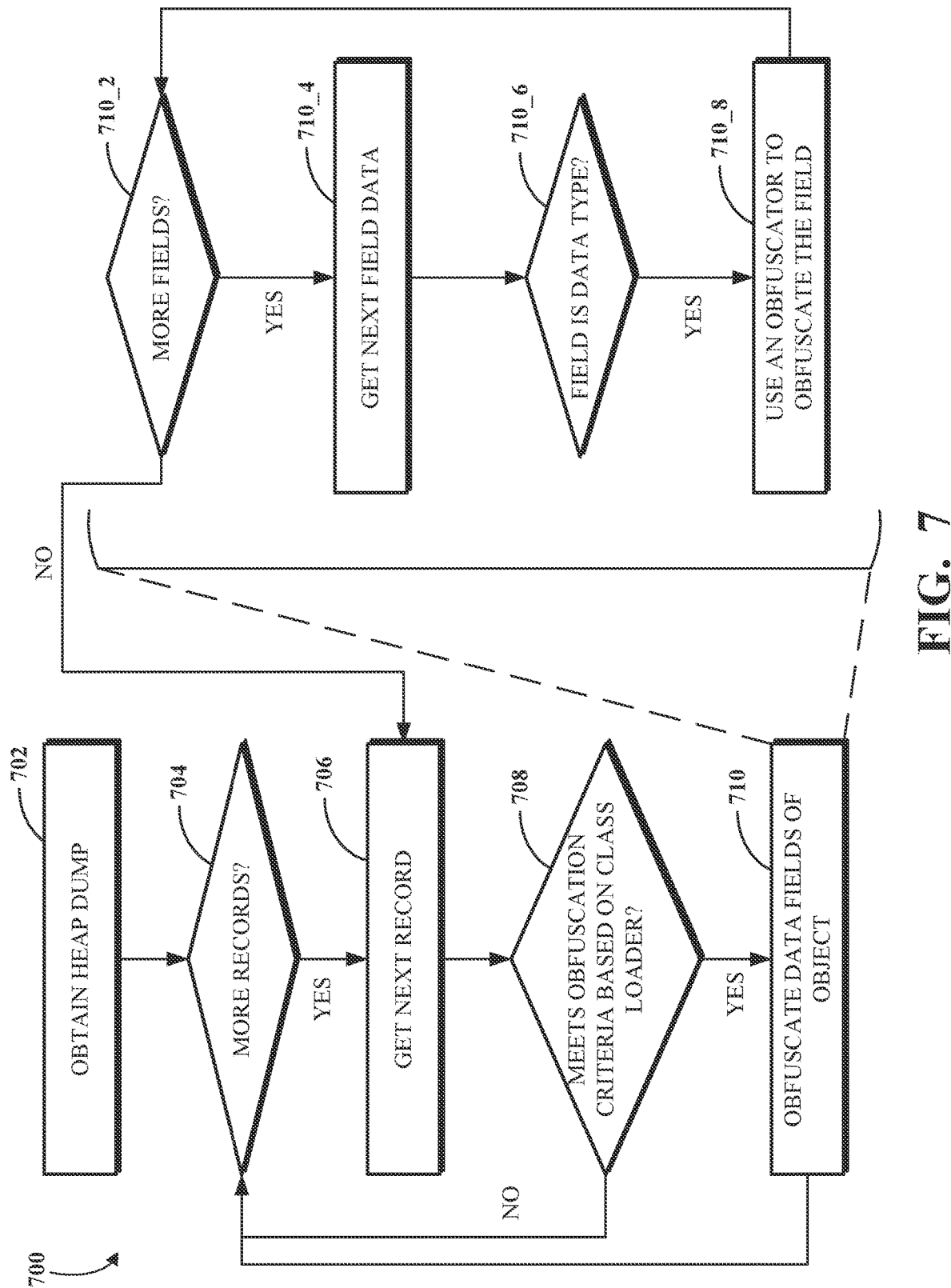
FIG. 7 is a flowchart of an example of a technique for obfuscating data in a heap dump.

To further describe some implementations in greater detail, reference is next made to examples of techniques which may be performed by or using a system for obfuscating data in a heap dump. FIG. 7 is a flowchart of an example of a technique 700 for obfuscating data in a heap dump. The technique 700 can be executed using computing devices, such as the systems, hardware, and software described with respect to FIGS. 1-6. The technique 700 can be performed, for example, by executing a machine-readable program or other computer-executable instructions, such as routines, instructions, programs, or other code. The steps, or operations, of the technique 700, or another technique, method, process, or algorithm described in connection with the implementations disclosed herein can be implemented directly in hardware, firmware, software executed by hardware, circuitry, or a combination thereof. The technique 700 can be implemented by a heap analysis software, such as the heap dump analysis software 406 of FIG. 4.

At 702, a heap dump is obtained. In an example, the heap dump is obtained as described with respect to heap dump obtaining tool 414 of FIG. 4. The technique 700, then proceeds to obfuscate the data values in the heap dump to obtained an obfuscated heap dump. Obfuscating the heap dump can be performed by the heap dump obfuscation tool 416 of FIG. 4.

In an example, the technique 700 can obfuscate the heap dump in place. That is, the technique 700 can modify the heap dump file itself. In an example, the technique 700 may create a new heap dump that is equivalent to the heap dump in structure and content except for the obfuscated values. In either case, the technique 700 is said to receive a heap dump and generate (e.g., derive or obtain) an obfuscated heap dump therefrom. In the case that a new heap dump is generated from the heap dump, and while not specifically shown in FIG. 7, the technique 700 can delete the obtained heap dump after the obfuscation completes.

The technique 700 iterates over records of the heap dump. As such, at 704, the technique 700 determines whether more records remain to be processed. If so, the technique 700 proceeds to 706 to get (e.g., retrieve or read) the next record from the heap dump; otherwise, the technique 700 ends (not shown).

At 708 the technique 700 determines whether the record meets one or more obfuscation criteria. In an example, the obfuscation criteria are met if the record is an object record (e.g., pertains to an instance of a class) and the class loader of the class of the object is of an application-specific class loader type. In an example, the obfuscation criteria are met if the record is an object record (e.g., pertains to an instance of a class) and the class loader of the class of the object is not of an application-specific class loader type but the class of an object that references the object is of an application-specific class loader type. If the record meets obfuscation criteria, the technique 700 proceeds to 710; otherwise, the technique 700 proceeds back to 704 to get the next record, if any.

At 710, the technique 700 obfuscates the data values included in the object. That is, the technique 700 obfuscates the data values associated with the object (e.g., instance) described in the record. Obfuscating a record at 710 includes the steps 710_2 to 710_8, which iterate over all of the fields of an object. For example, with respect to the instance 618 of FIG. 6, the technique 700 iterates over the fields LOC and PASSWORD.

At 710_2, the technique 700 determines whether the object (e.g., the record of the object) includes more fields. If so, the technique 700 proceeds to 710_4 to get (e.g., read or obtain) the field data from the record; otherwise, the technique 700 proceeds back to 706.

At 710_6, the technique 700 determines whether the field is a data type. That is, the technique 700 determines whether the field itself holds data. A data type as used herein can be a primitive data type, a reference data type, or a wrapper type. Primitive data types may include boolean, byte, short, int, long, float, double, and char. Reference data types may include, but are not limited to String, Date, List, Map, ArrayList, and any other data-structure type classes. Reference data types include container data types. A container class is a class that can contain other objects. Other examples of container types include java.util. LinkedList, java.util.Set, java.util. Queue, java.util.Deque, java.util. Vector, java.util. Stack, java.util.PriorityQueue, java.util.concurrent. CopyOnWriteArrayList, java.util.concurrent.ConcurrentHashMap, and other similar classes. Wrapper data types wrap the primitive data types of the same name. The Wrapper data types may include the classes Boolean, Integer, Long, Float, Double, and Character. It is noted that fully qualified of some classes are omitted for brevity.

At 710_8, the technique 700 may use an obfuscator appropriate to the data type to obfuscate the field. That is, the technique 700 may use or implement a delegation mechanism that delegates the task of obfuscating a field based on the type or the class of the field. To illustrate, if the field is of the Map type, then a Map obfuscator map determine the class types of the keys and values of the Map and obfuscate the values accordingly. To illustrate, and without limitations, if the keys and values are Strings, then the Map obfuscator may replace the values of the keys and the values with respective hashed values obtained therefrom. In another example, the Map obfuscator may in turn rely on a String obfuscator to obfuscate the values. If the field is of a String type, then a String obfuscator may replace each of the characters of the String with the same byte (e.g., "0" or some other byte). In another example, the String obfuscator may replace the characters of the String with random characters so long as the String length is preserved.

As another illustration, if the field is of a Date type, a Date obfuscator may set the time field of the object (which is of type long) to a random long value having the same length as the value of the object. In an example, a generic Object obfuscator may traverse all the fields of an object and obfuscate all non-static fields of the object. A primitive data obfuscator may set a field that is of a primitive data type to a first predefined value (e.g., 0). A wrapper data obfuscator may similarly set the wrapped value to a second predefined value (e.g., 0).

Referring again briefly to FIG. 6, an obfuscated String instance 620' illustrates how the String instance 620 is obfuscated. Specifically, the string "SECRET1" is replaced with "0000000." FIG. 6 also illustrates that the Locale instance 622 would be obfuscated into an Locale instance 622' since it is referenced from an object whose class loader is the application class loader 606 even though the class loader of the Locale instance 622 is the bootstrap class loader 602. On the other hand, the instance 616 of the Locale class is not obfuscated. However, as mentioned above, in an example, the Locale instance 622 would not be obfuscated since the class loader of the Locale instance 622 is the bootstrap class loader.

Figure 8:
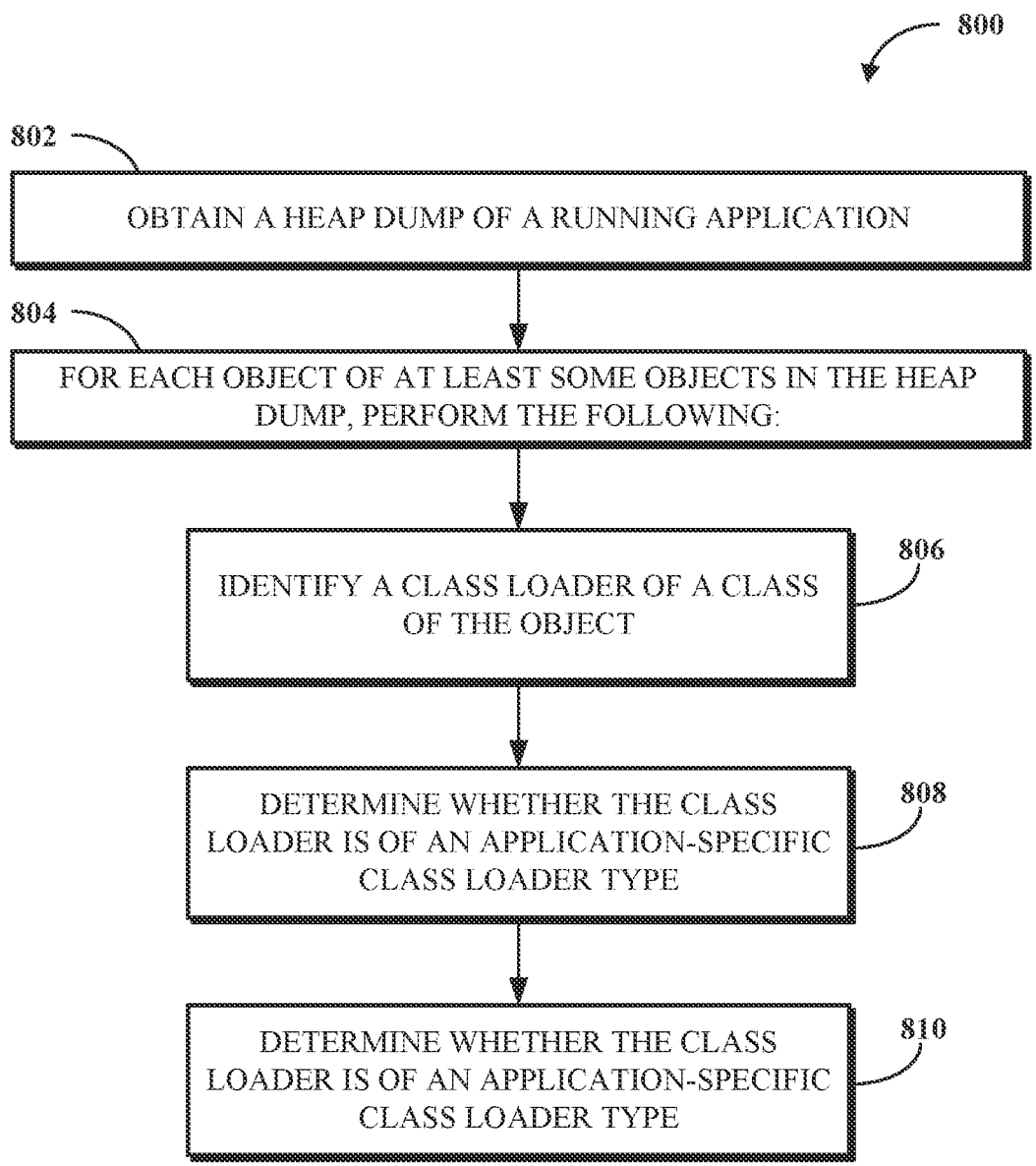
FIG. 8 is example of a flowchart of another technique for obfuscating data in a heap dump.

FIG. 8 is an example of a flowchart of a technique 800 for obfuscating data in a heap dump. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof. In one particular example, the technique 800 can be implemented by a heap analysis software, such as the heap dump analysis software 406 of FIG. 4.

At 802, a heap dump, such as that of a running application, is obtained. The technique 800 then iterates over the records in the heap dump and, at 804, performs for each object (e.g., an object) of one or more objects in the heap dump the steps 806-810. At 806, a class loader of a class of the object (i.e., a class loader of the object) is identified. As described above, the class loader can be identified using the information included in the record or using other records related to the record. At 808, the technique 800 determines whether the class loader is of an application-specific class loader type. At 810, in response to determining that the class loader is of the application-specific class loader type, the object is obfuscated. In an example, in response to determining that the class loader of another object is not of the application-specific class loader type, the other object is still obfuscated in response to determining that the other object is referenced by an object whose class loader is of the application-specific class loader type.

The application-specific class loader type can be an application class loader or custom class loader. Obfuscating the object can include obfuscating a data value of a field of the object based on a data type of the field. In an example, the object may include a field of type String and has an original value (i.e., the value in the heap dump). In such a case, obfuscating the object may include obtaining an obfuscated field by replacing each byte of the field with a pre-defined character such that the obfuscated field has a same length as a length of the original value. In an example, the object includes a field of type Map (i.e., java.util.Map). In such a case, obfuscating the object may include hashing each key and each value of the field.

For simplicity of explanation, the techniques 700 and 800 of FIGS. 7 and 8, respectively, are each depicted and described herein as a respective series of steps or operations. However, the steps or operations of the techniques 700 and 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The disclosure presented herein may be considered in view of the following clauses.

Example Clause A: A method, comprising: obtaining a heap dump of a running application; and for each object of one or more objects in the heap dump: identifying a class loader of a class of the object; determining whether the class loader is of an application-specific class loader type; and in response to determining that the class loader is of the application-specific class loader type, obfuscating the object.

Example Clause B: The method of Example Clause A, wherein determining whether the class loader is of the application-specific class loader type comprises: determining that the class loader is an application class loader.

Example Clause C: The method of Example Clause A or Example Clause B, wherein determining whether the class loader is of the application-specific class loader type comprises: determining that the class loader is a custom class loader.

Example Clause D: The method of any one of Example Clauses A-C, wherein obfuscating the object comprises: obfuscating a data value of a field of the object based on a data type of the field.

Example Clause E: The method of any one of Example Clauses A-D, wherein the object includes a field of type String and having an original value, and wherein obfuscating the object comprises: obtaining an obfuscated field by replacing each byte of the field with a pre-defined character such that the obfuscated field has a same length as a length of the original value.

Example Clause F: The method of any one of Example Clauses A-E, wherein the object includes a field of type Map, and wherein obfuscating the object comprises: hashing each key and each value of the field.

Example Clause G: The method of any one of Example Clauses A-F, wherein the object is a first object, further comprising: in response to determining that a class loader of a class of a second object of the one or more objects is not of the application-specific class loader type, obfuscating the second object in response to determining that the second object is referenced by another object whose class loader is of the application-specific class loader type.

Example Clause H: A system, comprising: one or more memories; and one or more processors, the one or more processors configured to execute instructions stored in the one or more memories to: obtain a heap dump of a running application; and for each object of one or more objects in the heap dump: identify a class loader of a class of the object; determine whether the class loader is of an application-specific class loader type; and in response to determining that the class loader is of the application-specific class loader type, obfuscate the object.

Example Clause I: The system of Example Clause H, wherein the class loader is determined to be an application class loader.

Example Clause J: The system of Example Clause H or Example Clause I, wherein the class loader is determined to be a custom class loader.

Example Clause K: The system of any one of Example Clauses H-J, wherein to obfuscate the object comprises to: delegating obfuscating a data value of a field of the object based on a data type of the field.

Example Clause L: The system of any one of Example Clauses H-K, wherein the object includes a field of type String and having an original value, and wherein to obfuscate the object comprises: setting the field to a random string having a same length as a length of the original value.

Example Clause M: The system of any one of Example Clauses H-L, wherein the object includes a field of type Map, and wherein to obfuscate the object comprises to: set a key of the field to a hashed value of the key; and set a value of the field to hash value of the value.

Example Clause N: The system of any one of Example Clauses H-M, wherein the one or more processors are further configured to execute instructions stored in the one or more memories to: in response to a determination that the class loader is not of the application-specific class loader type, obfuscating the object in response to a determination that the object is referenced by another object whose class loader is of the application-specific class loader type.

Example Clause O: A non-transitory computer readable medium storing instructions operable to cause one or more processors to perform operations comprising: obtaining a heap dump of a running application; and for each object of one or more objects in the heap dump: identifying a class loader of a class of the object; determining whether the class loader is of an application-specific class loader type; and in response to determining that the class loader is of the application-specific class loader type, obfuscating the object.

Example Clause P: The non-transitory computer readable medium of Example Clause O, wherein determining whether the class loader is of the application-specific class loader type comprises: determining that the class loader is an application class loader or a custom class loader.

Example Clause Q: The non-transitory computer readable medium of Example Clause O or Example Clause P, wherein a data value of a field of the object is obfuscated based on a data type of the field.

Example Clause R: The non-transitory computer readable medium of any one of Example Clauses O-Q, wherein the object includes a field of type String and having an original value, and wherein obfuscating the object comprises: setting the field to a random string that has a same length as a length of the original value.

Example Clause S: The non-transitory computer readable medium of any one of Example Clauses O-R, wherein the object includes a field of type Map, and wherein obfuscating the object comprises: obfuscating a key and a value of the fields by setting the key and the value to respective hashed values.

Example Clause T: The non-transitory computer readable medium of any one of Example Clauses O-S, wherein the operations further comprise: in response to a determination that the class loader is not of the application-specific class loader type, obfuscating the object in response to a determination that the object is referenced by another object whose class loader is of the application-specific class loader type.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    obtaining a heap dump of a running application, wherein the heap dump is a snapshot of at least a portion of a heap at a particular point in time, and wherein the heap represents runtime data of the running application; and
    for each object of one or more objects in the heap dump, wherein the each object includes data values stored in fields of the each object:
        identifying a class loader of a class of the each object based on class loader information in the heap dump;
        determining whether the class loader is of an application-specific class loader type;
        in response to determining that the class loader is of the application-specific class loader type, obfuscating the each object; and
        in response to determining that the class loader is not of the application-specific class loader type, obfuscating the each object in response to a determination that the each object is referenced by another object whose class loader is of the application-specific class loader type.

2. The method of claim 1, wherein determining whether the class loader is of the application-specific class loader type comprises:
    determining that the class loader is an application class loader.

3. The method of claim 1, wherein determining whether the class loader is of the application-specific class loader type comprises:
    determining that the class loader is a custom class loader.

4. The method of claim 1, wherein obfuscating the each object comprises:
obfuscating a data value of a field of the each object based on a data type of the field.

5. The method of claim 1, wherein the each object includes a field of type String and having an original value, and wherein obfuscating the each object comprises:
obtaining an obfuscated field by replacing each byte of the field with a pre-defined character such that the obfuscated field has a same length as a length of the original value.

6. The method of claim 1, wherein the each object includes a field of type Map, and wherein obfuscating the each object comprises:
hashing each key and each value of the field.

7. The method of claim 1, wherein obfuscating the each object comprises:
setting a field of type Date to a random long value having a same length as an original time value of the field.

8. The method of claim 1, wherein obfuscating the each object comprises:
traversing all non-static fields of the each object and obfuscating the non-static fields based on corresponding data types.

9. The method of claim 1, wherein obfuscating the each object comprises:
for a field of a primitive data type, setting the field to a predefined value; and
for a field of a wrapper data type, setting a value of the field to a different predefined value.

10. A system, comprising:
one or more memories; and
one or more processors, the one or more processors configured to execute instructions stored in the one or more memories to:
obtain a heap dump of a running application, wherein the heap dump is a snapshot of at least a portion of a heap at a particular point in time, and wherein the heap represents runtime data of the running application; and
for each object of one or more objects in the heap dump, wherein the each object includes data values stored in fields of the each object:
identify a class loader of a class of the each object based on class loader information in the heap dump;
determine whether the class loader is of an application-specific class loader type;
in response to determining that the class loader is of the application-specific class loader type, obfuscate the each object; and
in response to determining that the class loader is not of the application-specific class loader type, obfuscate the each object in response to a determination that the each object is referenced by another object whose class loader is of the application-specific class loader type.

11. The system of claim 10, wherein the class loader is determined to be an application class loader.

12. The system of claim 10, wherein the class loader is determined to be a custom class loader.

13. The system of claim 10, wherein to obfuscate the each object comprises to:
delegating obfuscating a data value of a field of the each object based on a data type of the field.

14. The system of claim 10, wherein the each object includes a field of type String and having an original value, and wherein to obfuscate the each object comprises:
setting the field to a random string having a same length as a length of the original value.

15. The system of claim 10, wherein the each object includes a field of type Map, and wherein to obfuscate the each object comprises to:
set a key of the field to a hashed value of the key; and
set a value of the field to hash value of the value.

16. A non-transitory computer readable medium storing instructions operable to cause one or more processors to perform operations comprising:
obtaining a heap dump of a running application, wherein the heap dump is a snapshot of at least a portion of a heap at a particular point in time, and wherein the heap represents runtime data of the running application; and
for each object of one or more objects in the heap dump, wherein the each object includes data values stored in fields of the each object:
identifying a class loader of a class of the each object based on class loader information in the heap dump;
determining whether the class loader is of an application-specific class loader type;
in response to determining that the class loader is of the application-specific class loader type, obfuscating the each object; and
in response to determining that the class loader is not of the application-specific class loader type, obfuscating the each object in response to a determination that the each object is referenced by another object whose class loader is of the application-specific class loader type.

17. The non-transitory computer readable medium of claim 16, wherein
determining whether the class loader is of the application-specific class loader type comprises:
determining that the class loader is an application class loader or a custom class loader.

18. The non-transitory computer readable medium of claim 16, wherein a data value of a field of the each object is obfuscated based on a data type of the field.

19. The non-transitory computer readable medium of claim 16, wherein the each object includes a field of type String and having an original value, and wherein obfuscating the each object comprises:
setting the field to a random string that has a same length as a length of the original value.

20. The non-transitory computer readable medium of claim 16, wherein the each object includes a field of type Map, and wherein obfuscating the each object comprises:
obfuscating a key and a value of the fields by setting the key and the value to respective hashed values.

* * * * *